(12) United States Patent
Monahan

(10) Patent No.: US 7,520,546 B2
(45) Date of Patent: Apr. 21, 2009

(54) LEAF AND DEBRIS CLEAN-UP APPARATUS

(76) Inventor: Robert Monahan, 371 Liberty St., Rockland, MA (US) 02370

( * ) Notice: Subject to any disclaimer, the term of this patent is extended or adjusted under 35 U.S.C. 154(b) by 192 days.

(21) Appl. No.: 11/673,544

(22) Filed: Feb. 9, 2007

(65) Prior Publication Data

US 2008/0191501 A1    Aug. 14, 2008

(51) Int. Cl.
*B65D 37/00* (2006.01)
(52) U.S. Cl. .................... 294/1.1; 15/257.1
(58) Field of Classification Search ............. 294/1.1, 294/1.3, 55; 229/103, 198.1, 199; 15/257.1; 280/19; 135/116
See application file for complete search history.

(56) References Cited

U.S. PATENT DOCUMENTS

| | | | | |
|---|---|---|---|---|
| 3,469,762 A | * | 9/1969 | Torre | 229/122 |
| 3,943,953 A | * | 3/1976 | Cantwell et al. | 135/156 |
| 4,173,351 A | * | 11/1979 | Hetland | 280/19 |
| 4,434,829 A | * | 3/1984 | Barnard | 383/34 |
| 5,078,096 A | * | 1/1992 | Bishop et al. | 119/497 |
| 5,211,434 A | * | 5/1993 | Lanava | 294/1.1 |
| 5,709,477 A | * | 1/1998 | Schinasi et al. | 383/4 |
| 6,138,700 A | * | 10/2000 | Stoddart | 135/87 |
| 6,843,261 B2 | * | 1/2005 | Gillis | 135/156 |

* cited by examiner

*Primary Examiner*—Dean J Kramer
(74) *Attorney, Agent, or Firm*—Fish & Richardson P.C.

(57) ABSTRACT

The present invention relates to an apparatus for cleaning outdoor debris such as leaves and lawn clippings. The preferred embodiment of the apparatus comprises a resistant, pliable mat and wall element. The present invention can be secured in place through stakes or posts and is configured to allow a user to directly push debris onto the mat, without having to hold the apparatus in place. The wall element retains the debris in place once debris has been collected on the mat. The pliable nature of the mat allows the user to lift and transport the apparatus more easily when filled with a load. The user can also fold the apparatus into a compact configuration for easy storage.

6 Claims, 2 Drawing Sheets

LEAF AND DEBRIS CLEAN-UP APPARATUS

BACKGROUND OF THE INVENTION

1. Field of the Invention

The present invention relates to the cleanup and removal of leaves and outdoor debris. Specifically, the invention provides for an improved means to collect and gather outdoor debris and easily dispose of such waste.

2. Description of the Related Art

Prior art patents directed at outdoor cleanup primarily focus on attachments for conventional waste disposal bags that facilitate the ability to sweep debris directly into waste disposal bags.

U.S. Pat. No. 5,498,046, titled "Manual Scoop and Rake System for Collecting Leaves and Other Light Debris" discloses a funnel like attachment for a disposal bag. The ensemble is placed on the ground and the user pushes debris directly into the system. While the apparatus allows the user to fill a disposal bag without having to hold the disposal bag open, it does not allow the user to push large volumes of debris into the bag. The user is limited in the volume of debris that can be pushed in the disposal bag in one motion due to the limited opening provided by the funnel like attachment.

U.S. Pat. No. 5,323,990, titled "Leaf Ramp and Bag Holder Apparatus" teaches an apparatus whereby a user gathers debris with a rake and pushes it up a ramp, where it is deposited in a waste receptacle. The upward movement of debris requires that the user assume an awkward position, causing discomfort with prolonged use. Additionally, because the user must push debris in an upward direction, the volume of debris that can be placed in the waste receptacle in one motion is severely limited, as gravity forces much of the debris falling outside the rake away from the waste receptacle.

U.S. Pat. No. 5,065,965, titled "Manual Scoop and Rake System for Collecting Leaves and Other Light Debris" teaches a frame that can be inserted and attached to the opening of a standard waste disposal bag so that a waste disposal bag can remain in a fully opened position. Similar to the U.S. Pat. No. 5,498,046 Patent described above, the user is limited in the volume of debris that can be pushed into the disposal bag in one motion. This is due to the limitations placed by the enclosed opening of the disposal bag.

The shortcoming of the prior art described above is that the devices do not facilitate the cleanup of large volumes of leaves. Prior art apparatus require that the user directly push leaves into enclosed bags or receptacles. Because the user must create piles that are small enough to fit through the openings of the enclosed openings of the prior art apparatus, these apparatus do not facilitate the disposal of large volumes of debris in one motion. These types of apparatus are impractical for large volumes of leaves and debris.

The present invention provides for an efficient means of quickly directing large volumes of leaves and debris in one motion onto a disposal mat, where the user can easily gather the debris and dispose of it.

SUMMARY OF THE INVENTION

The present invention is a novel apparatus that improves the efficiency and ease of outdoor cleanup jobs. In a preferred embodiment of the invention, the apparatus comprises a flexible, lightweight mat, having a generally planar configuration. A wall surrounds a part of the planar portion, providing a means of containing debris. A portion of the planar mat is unenclosed, providing an area in which debris can be pushed directly onto the planar mat with a broom, rake, or other cleaning tool.

The present invention improves the ease in which leaves and debris can be collected and disposed of because of the unhindered configuration of the apparatus. Because the planar mat is not fully enclosed, the user can rake debris directly onto the planar mat, without bending or leaning over or assuming awkward positions. The configuration of the apparatus allows the user to push large volumes of debris onto the mat in one sweeping motion due to the open, unhindered configuration of the apparatus.

DETAILED DESCRIPTION OF THE DRAWINGS

Figure 1:
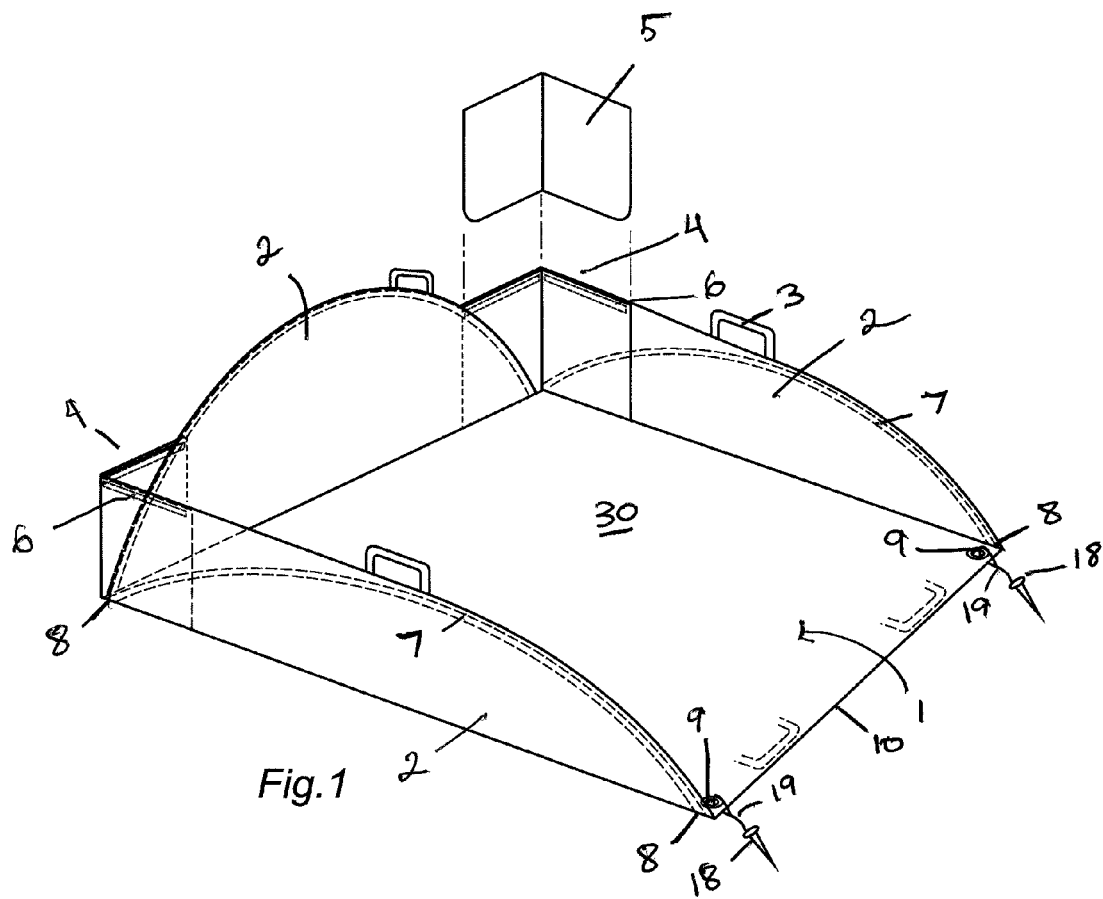
FIG. 1 is a perspective view of the preferred embodiment of the invention.

FIG. 1 shows a perspective view of the present invention. The apparatus comprises a mat portion 1 having a planar or substantially planar configuration. The mat is intended to rest directly on the surface to be cleared, such as a lawn, dirt surface, concrete or asphalt. Surrounding a portion of the mat is a wall element 2. The wall element assumes an upright position and serves as a barrier for movement of debris once pushed onto the mat portion. The wall element may further include multiple handle features 3 that allow the user to securely hold the apparatus for disposal and transport of loads.

The wall elements may include compartments 4 for the insertion of corner inserts 5. The corner inserts may be constructed from rigid material such as cardboard or plastic. In a preferred embodiment of the invention, the corner inserts are constructed from corrugated plastic. When the corner inserts are placed within the compartments, the wall elements are able to maintain an upright position. Attachment means 6 such as Velcro, snaps, buttons, or zippers may be used to retain the corner inserts within the compartments. Alternatively, the corner inserts may be secured more permanently in position by stitching.

Included within the outer edge of the wall element are support rods 7 that are contained within slots 8 that hold the support rods in place. The rods provide additional structure to the wall elements, improving the ability of the wall elements to maintain an upright position, thus better containing debris. The rods are constructed from semi-rigid material that can withstand tension formed when placed in a curved position when bent and return to a straight configuration on release. In the preferred embodiment, the support rods consist of shock corded tent poles, commonly used in the tent industry.

Openings 9 may be provided on the corner edges which allow for attachment of pegs 18. Pegs can in turn be driven into the work surface. The pegs may be constructed from plastic, metal, or wood, and may be releasably attached to the openings through nylon or rope 19. The head of the peg may have a large diameter, allowing the user to easily drive the peg into the work surface, or remove the peg from the work surface by hand. Once the apparatus is secured onto the work surface, the user can direct debris onto the mat without having to hold the mat in position. The user is able to then use both hands for directing debris onto the mat.

A receiving area 10 is included on the mat. Said receiving area lacks a wall element and enables the user to push debris unobstructed onto the mat.

The wall elements 2 shall project vertically or substantially vertical from the perimeter of the mat for a distance sufficient to contain leaves and debris. A top surface 30 of the mat remains unenclosed as shown in FIG. 1. The mat remains unobstructed and leaves and debris may be placed directly on the top surface 30, or swept onto the top surface via the receiving area 10. The unobstructed top surface of the mat portion and receiving area 10 facilitates the ease and efficiency in which large volumes of leaves and debris may be swept directly onto the mat portion.

The mat is constructed from flexible, light-weight material which may include burlap, canvas, woven plastic, or any other pliable, yet durable material. The pliable nature of the material should allow for the mat to be folded into a reduced size, for compact and convenient storage. The wall element may be constructed from the same material as the mat. When the support rods are removed from the wall elements, the apparatus may be folded into a reduced size, for convenient and compact storage.

Figure 2:
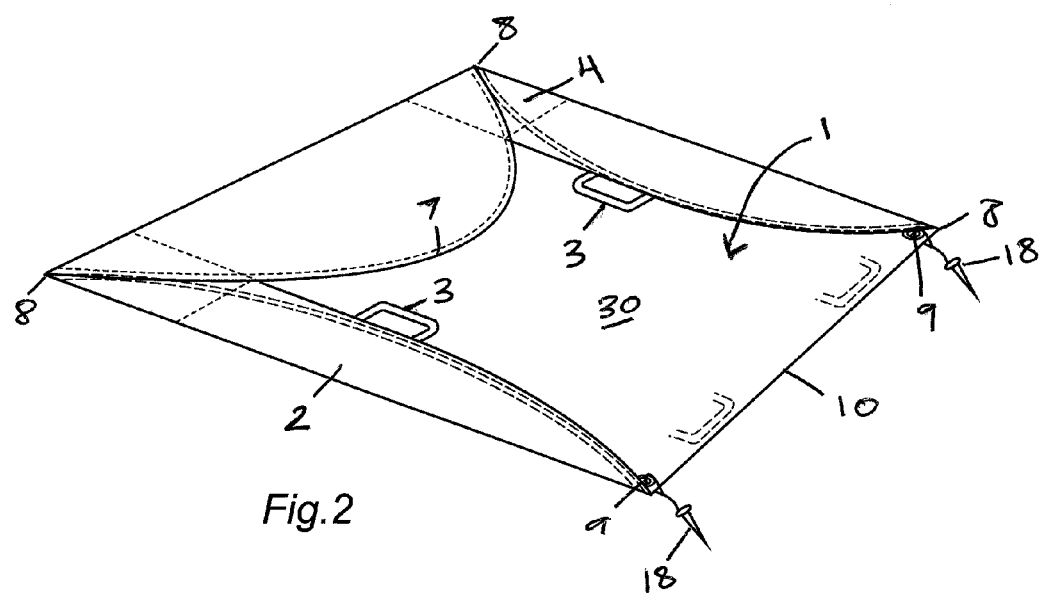
FIG. 2 is a planar view of the preferred embodiment of the invention fully collapsed.

FIG. 2 shows a planar view of the preferred embodiment of the present invention in a collapsed position. To position the apparatus in a collapsed position, the corner inserts 5 are removed from the compartments 4. Removing the corner inserts from the compartments allows the wall elements to collapse within the mat. The support rods may be removed from the slots allowing the user to fold the apparatus, further compressing the apparatus into a smaller size.

For transport and/or disposal of a load, the user simply grabs the handle features 3 of the apparatus. The pliable nature of the present invention allows the user to lift up the apparatus and partially cover the load so that the load is retained within the apparatus during movement. Lightweight loads such as leaves and lawn clippings more easily remain on the mat during transport and movement because the apparatus can assume a partially covered configuration.

Figure 3:
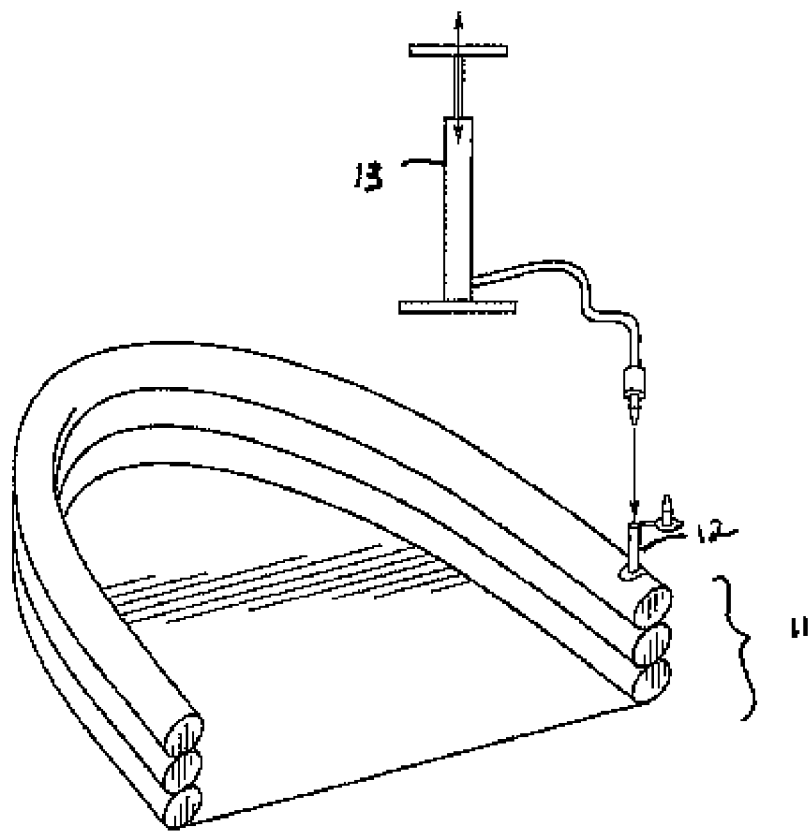
FIG. 3 is a perspective view of a second embodiment of the invention.

FIG. 3 shows a second embodiment of the present invention whereby the wall element of the apparatus is comprised of an inflatable feature 11. The inflatable feature may have a crescent shape and may be constructed from plastic or thermo-set material. The inflatable feature may be comprised of a single tubing or may be comprised of multiple tubings. Said tubings may be comprised of cylindrical, plastic units which may be inflated.

The inflatable feature further comprises one or more air valves 12 from which a standard bicycle pump 13 may be attached to inflate the inflatable feature mechanically. In embodiments where there are multiple tubings, the tubings may communicate with one another, requiring one valve, or be separated, requiring multiple valves. The mat portion of the second embodiment may be constructed from the same plastic as the inflatable feature or any other pliable material including those materials taught for the preferred embodiment of the present invention.

The second embodiment may also be collapsed for storage by deflating the air from the wall element. Once deflated, the apparatus can be folded into a compact unit.

Figure 4:
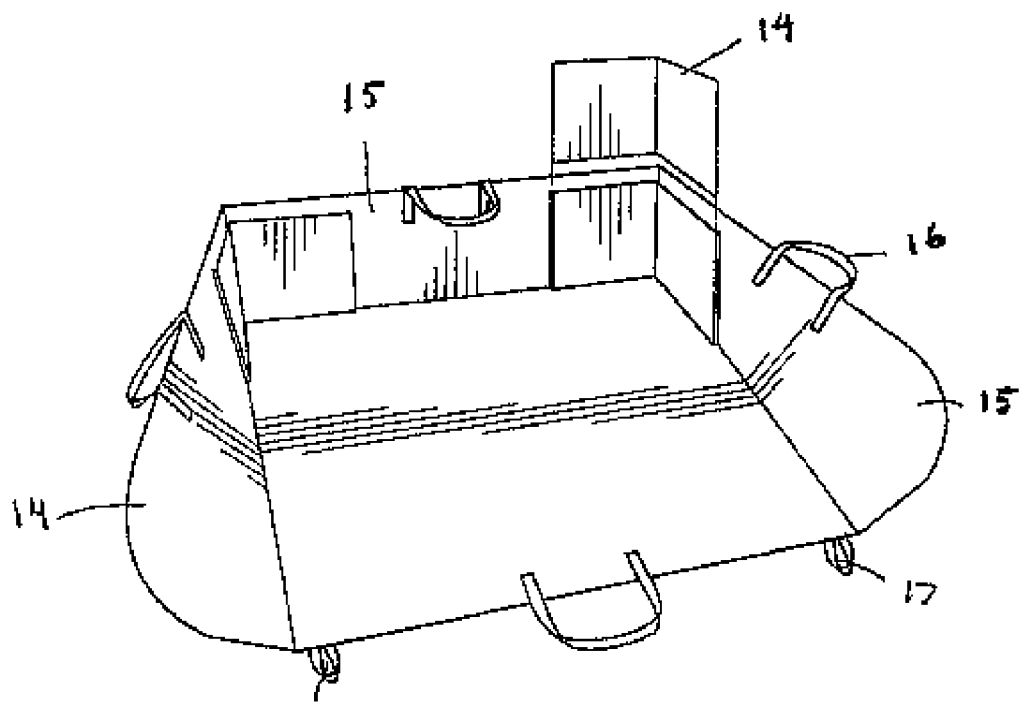
FIG. 4 is a perspective view of a third embodiment of the invention.

FIG. 4 shows an alternative embodiment of the preferred embodiment of the present invention whereby the apparatus lacks the support rods present in the Preferred Embodiment. Corner inserts 14 alone provide the upright structure of a wall unit 15. The wall unit has a less vertical configuration when compared to the preferred embodiment of the present invention. Handles 16 are present in the third embodiment for easy transport of loads. Loops 17 are present on the third embodiment that allow for the apparatus to be secured to a malleable surface such as grass or dirt through stakes, posts, or other securing means. Materials from which this embodiment may be constructed include burlap, wool, woven plastic, and canvas.

With respect to the above description, it is to be realized that the optimum dimensional relationships for the parts of the invention, to include variations in size, materials, shape, form, function, manner and use are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An apparatus for the clean up of leaves and outdoor debris, the apparatus comprising:
   a planar or substantially planar mat;
   the mat being constructed from a non-rigid, flexible material;
   wall elements disposed about a perimeter of at least a portion of the mat, each wall element having a corner insert compartment; and
   a corner insert configured to be received in the compartments of two adjacent wall elements;
   wherein the corner insert comprises first and second substantially planar portions attached to one another, the first corner insert portion being received by the corner insert compartment of one of the adjacent wall elements and the second corner insert portion being received in the corner insert compartment of the other adjacent wall element for forming a substantially rigid corner between the two adjacent wall elements.

2. The apparatus of claim 1, further comprising at least one handle feature joined to at least one wall element.

3. The apparatus of claim 1, wherein each wall element further comprises one or more support rods.

4. The apparatus of claim 3, wherein each support rod comprises a shock corded tent pole.

5. The apparatus of claim 1, wherein the two adjacent wall elements are attached to the received corner insert by at least one fastener.

6. An apparatus for the clean up of leaves and outdoor debris, the apparatus comprising:
   a planar or substantially planar mat;
   the mat being constructed from a non-rigid, flexible material;
   wall elements disposed about a perimeter of at least a portion of the mat, each wall element comprising:
   a corner insert compartment; and
   at least one compliant support rod disposed along at least a portion of a perimeter of the wall element; and
   a corner insert configured to be received in the compartments of two adjacent wall elements;
   wherein the corner insert comprises first and second substantially planar portions attached to one another, the first corner insert portion being received by the corner insert compartment of one of the adjacent wall elements and the second corner insert portion being received in the corner insert compartment of the other adjacent wall element for forming a substantially rigid corner between the two adjacent wall elements.

* * * * *